US009363987B2

(12) United States Patent
Hiraoka

(10) Patent No.: US 9,363,987 B2
(45) Date of Patent: Jun. 14, 2016

(54) LINE ROLLER AND FISHING LINE GUIDE MECHANISM USING SAME

(71) Applicant: Shimano Inc., Sakai, Osaka (JP)

(72) Inventor: Hirokazu Hiraoka, Osaka (JP)

(73) Assignee: Shimano Inc., Osaka (JP)

( * ) Notice: Subject to any disclaimer, the term of this patent is extended or adjusted under 35 U.S.C. 154(b) by 48 days.

(21) Appl. No.: 14/225,765

(22) Filed: Mar. 26, 2014

(65) Prior Publication Data

US 2014/0312153 A1    Oct. 23, 2014

(30) Foreign Application Priority Data

Apr. 19, 2013    (JP) ................................. 2013-88336
Apr. 19, 2013    (JP) ................................. 2013-88337
Dec. 13, 2013    (JP) ............................... 2013-257607

(51) Int. Cl.
     *A01K 89/01*      (2006.01)

(52) U.S. Cl.
     CPC ................................ *A01K 89/0108* (2013.01)

(58) Field of Classification Search
     CPC .............. A01K 89/01; A01K 89/0108; A01K 89/01082
     USPC .................................................. 242/230, 231
     See application file for complete search history.

(56) References Cited

U.S. PATENT DOCUMENTS 5,560,561 A * 10/1996 Henriksson .................... 242/231
5,984,219 A * 11/1999 Miyajima et al. ............. 242/231
6,161,786 A * 12/2000 Ohara et al. ................... 242/231
6,336,604 B1 * 1/2002 Aratake et al. ................ 242/231
7,137,585 B2 * 11/2006 Ochiai ........................... 242/231
7,967,232 B2 * 6/2011 Hiraoka et al. ............... 242/231
2002/0079395 A1 * 6/2002 Matsuda ........................ 242/231
2004/0124298 A1 * 7/2004 Okada et al. .................. 242/231
2012/0048981 A1 * 3/2012 Ohara et al. ................... 242/230

FOREIGN PATENT DOCUMENTS

JP      4-316443 A      11/1992
JP      2001-190192 A      7/2001
JP      2003-265078 A      9/2003

OTHER PUBLICATIONS

European Search Report of corresponding EP Application No. 14 16 2880.0 dated Aug. 29, 2014.

* cited by examiner

*Primary Examiner* — Emmanuel M Marcelo
(74) *Attorney, Agent, or Firm* — Global IP Counselors

(57) ABSTRACT

A line roller basically includes a bearing member and a guide member. The bearing member includes: an inner race having a cylindrical shape; an outer race having a cylindrical shape and a plurality of rotting elements. The outer race is disposed on an outer peripheral side of the inner race. The rolling elements are circumferentially aligned at intervals between the inner race and the outer race. The guide member is made of a material of the same kind as that of the outer race. Further, the guide member is a tubular member having a guide surface for guiding a fishing line on the outer peripheral surface thereof. The guide member is firmly fixed to the bearing member on the outer peripheral surface of the bearing member.

16 Claims, 10 Drawing Sheets

LINE ROLLER AND FISHING LINE GUIDE MECHANISM USING SAME

CROSS-REFERENCE TO RELATED APPLICATIONS

This application claims priority to Japanese Patent Applications Nos. 2013-88336 filed on Apr. 19, 2013, 2013-88337 filed on Apr. 19, 2013, and 2013-257607 filed on Dec. 13, 2013, the entirety of which is hereby incorporated herein by reference in its entirety.

BACKGROUND OF THE INVENTION

1. Field of the Invention

The present invention relates to a line roller and a fishing line guide mechanism using the same.

2. Background Art

A spinning reel includes a spool, a rotor having a pair of rotor arms, and a fishing line guide mechanism (so-called a bail arm mechanism) pivotally mounted to the tip ends of the pair of the rotor arms. The fishing line guide mechanism is a mechanism for guiding a fishing line onto the spool. The fishing line guide mechanism is mainly composed of a bail, a pair of bail support members for supporting the both ends of the bail, and a line roller. The line roller is generally mounted to a bearing through a bushing. For example, Japanese Laid-Open Patent Application Publication No. JP-A-H04-316443 describes a type of line roller having a structure with a recess on the outer peripheral surface of the bearing in order to implement more smooth rotation of the line roller. Smoothness in rotation of the line roller is enhanced by thus reducing the number of components such as the bushing.

SUMMARY OF THE INVENTION

It has been discovered that certain drawbacks exists in the aforementioned line roller that has a structure with a recess on an outer peripheral surface of an outer race of the bearing. For example, when the recess is formed on the outer race of the bearing, this inevitably poses negative impact on, for example, contact between the outer race and rolling elements. As a result, chances are that smoothness in rotation of the bearing will likely deteriorate.

It is an object of the present invention to provide a line roller that more smoothly rotates for guiding a fishing line onto a spool of a spinning reel.

A line roller according to a first aspect of the present invention is provided for guiding a fishing line onto a spool of a spinning reel. The line roller includes a bearing member and a guide member. The bearing member includes an inner race, an outer race and a plurality of rolling elements. The inner race has a cylindrical shape. The outer race has a cylindrical shape, and is disposed on an outer peripheral side of the inner race. The rolling elements are circumferentially aligned at intervals between the inner race and the outer race. The guide member has a tubular shape. The guide member is made of a material of the same kind as a material of the outer race. The guide member has a guide surface for guiding the fishing line on an outer peripheral surface of the guide member. Further, the guide member is firmly fixed to the bearing member on an outer peripheral surface of the bearing member.

According to the structure, the bearing member and the guide member are provided as separate members. Therefore, even when the guide surface, which is the outer peripheral surface of the guide member, is processed, this does not negatively affect smoothness in rotation of the bearing member. Further, the guide member is directly and firmly fixed onto the bearing member. Therefore, the line roller is smoothly rotated. It should be noted that occurrence of galvanic corrosion can be suppressed between the guide member and the bearing member, although the guide member is directly and firmly fixed onto the bearing member. This is due to the fact that the guide member and the bearing member are made of the same kind of materials.

Preferably, the line roller further includes a seal member having an annular shape. Preferably, the guide member further has a protruded portion that protrudes axially more than the outer race in an axial direction of the bearing member. Preferably, the seal member extends radially inwards from an inner peripheral surface of the protruded portion with respect to the axial direction of the bearing member.

According to the structure, the annular seal member is disposed so as to extend radially inwards from the inner peripheral surface of the protruded portion of the guide member. Therefore, an axially lateral surface of the bearing can be covered with the seal member. As a result, it is possible to prevent troubles such as water intrusion into the bearing member by the seal member.

Preferably, the line roller further includes a restriction member having a cylindrical shape and that is disposed axially adjacent to the bearing member. Preferably; the seal member extends toward an outer peripheral surface of the restriction member. According to the structure, an axially lateral surface of the bearing can be covered with the seal member that extends between the protruded portion and the restriction member. Therefore, it is possible to prevent troubles such as water intrusion into the bearing member.

Preferably, an inner peripheral of the seal member faces the outer peripheral surface of the restriction member with a gap between the inner peripheral end of the seal member and the outer peripheral surface of the restriction member. At least one of the inner peripheral end of the seal member and the outer peripheral surface of the restriction member has water repellency. According to the structure, the seal member and the restriction member do not make contact with each other. Therefore, this does not negatively affect smoothness in rotation of the bearing. Further, at least one of the inner peripheral end of the seal member and the outer peripheral surface of the restriction member has water repellency. Therefore, it is possible to prevent water intrusion into the bearing member even though there is a gap between the seal member and the restriction member. It is more preferable that the outer peripheral surface of the restriction member has water repellency in terms of aging, an effect of an external environment, and easy water repellent processing.

Alternatively, the inner peripheral end of the seal member may contact the outer peripheral surface of the restriction member.

Preferably, at least one of the inner peripheral end of the seal member and the outer peripheral surface of the restriction member has water repellency. According to the structure, water is repelled by at least one of the inner peripheral end of the seal member and the outer peripheral surface of the restriction member. Therefore, it is possible to more reliably prevent water intrusion into the bearing member. It is more preferable that the outer peripheral surface of the restriction member has water repellency in terms of aging, an effect of an external environment, and easy water repellent processing.

Preferably, the inner race of the bearing member has an axial length larger than an axial length of the outer race. Further, the seal member preferably has an inner peripheral end that contacts an outer peripheral surface of the inner race. According to the structure, an axially lateral surface of the bearing member can be covered with the seal member that extends between the protruded portion and the inner race. Therefore, it is possible to prevent troubles such as water intrusion into the bearing member.

Preferably, the inner race, the outer race and the guide member are made of the same kind of materials. According to the structure, occurrence of galvanic corrosion can be further suppressed.

Preferably, the guide surface of the guide member has a circumferentially extending annular recess. According to the structure, the fishing line can be guided onto the spool using the recess formed on the guide surface.

Preferably, the guide member and the outer race are made of metals or alloys having the same ionization tendency. According to the structure, occurrence of galvanic corrosion can be suppressed.

Preferably, the outer race and the guide member are made of stainless steel.

Preferably, the guide member is press fitted onto the outer race. According to the structure, the guide member can be easily and firmly fixed onto the outer race.

Preferably, the guide member has an inner peripheral surface adhered onto an outer peripheral surface of the outer race. According to the structure, the guide member can be more reliably and firmly fixed onto the outer race.

Preferably, the guide member has a surface treated layer at least on the guide surface. The surface treated layer is formed by surface treating. According to the structure, it is possible to achieve enhancement in a variety of features such as enhancement in durability of the guide surface and reduction in frictional resistance with the fishing line. Further, the guide member and the bearing member are provided as separate members. Therefore, surface treating can be easily performed only for the guide member.

A fishing line guide mechanism according to a second aspect of the present invention is provided with the line roller discussed above for guiding a fishing line onto a spool of a spinning reel. The fishing line guide mechanism is mounted to tip ends of a pair of rotor arms of a rotor of the spinning reel. The fishing line guide mechanism further includes a bail, a first bail support member, a second bail support member and a stationary shaft. The first bail support member is configured to be mounted to the tip end of one of the rotor arms and supports a first end of the bail. The second bail support member is configured to be mounted to the tip end of the other of the rotor arms and supports a second end of the bail. The stationary shaft extends between the first bail support member and the first end of the bail. The line roller is rotatably supported by the stationary shaft.

According to the present invention, it is possible to provide a line roller that can be more smoothly rotated.

BRIEF DESCRIPTION OF THE DRAWINGS

Referring now to the attached drawings which form a part of this original disclosure.

DETAILED DESCRIPTION OF THE EMBODIMENTS

Figure 1:
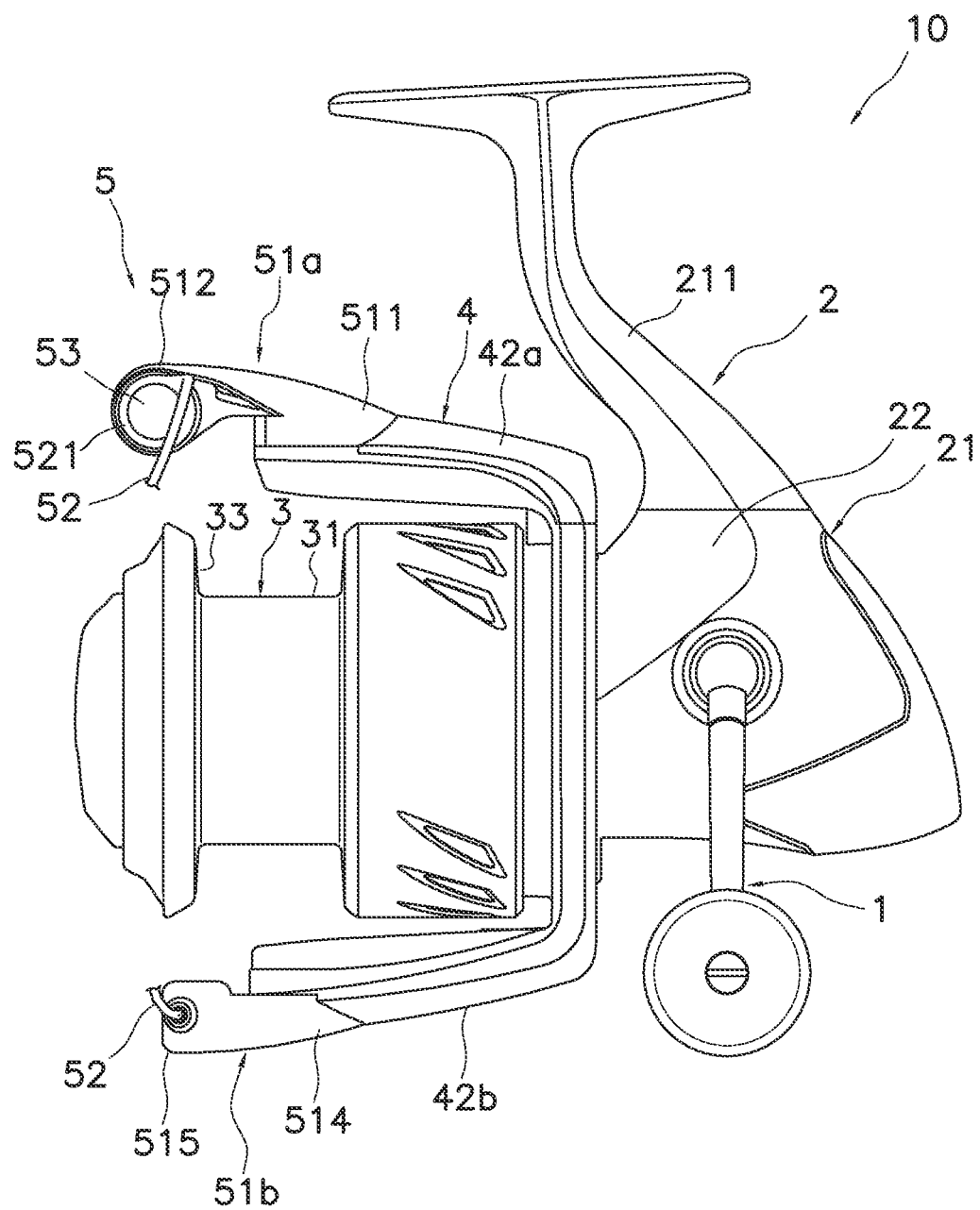
FIG. 1 is a left side elevational view of a spinning reel in accordance with a first illustrative embodiment.
Figure 2:
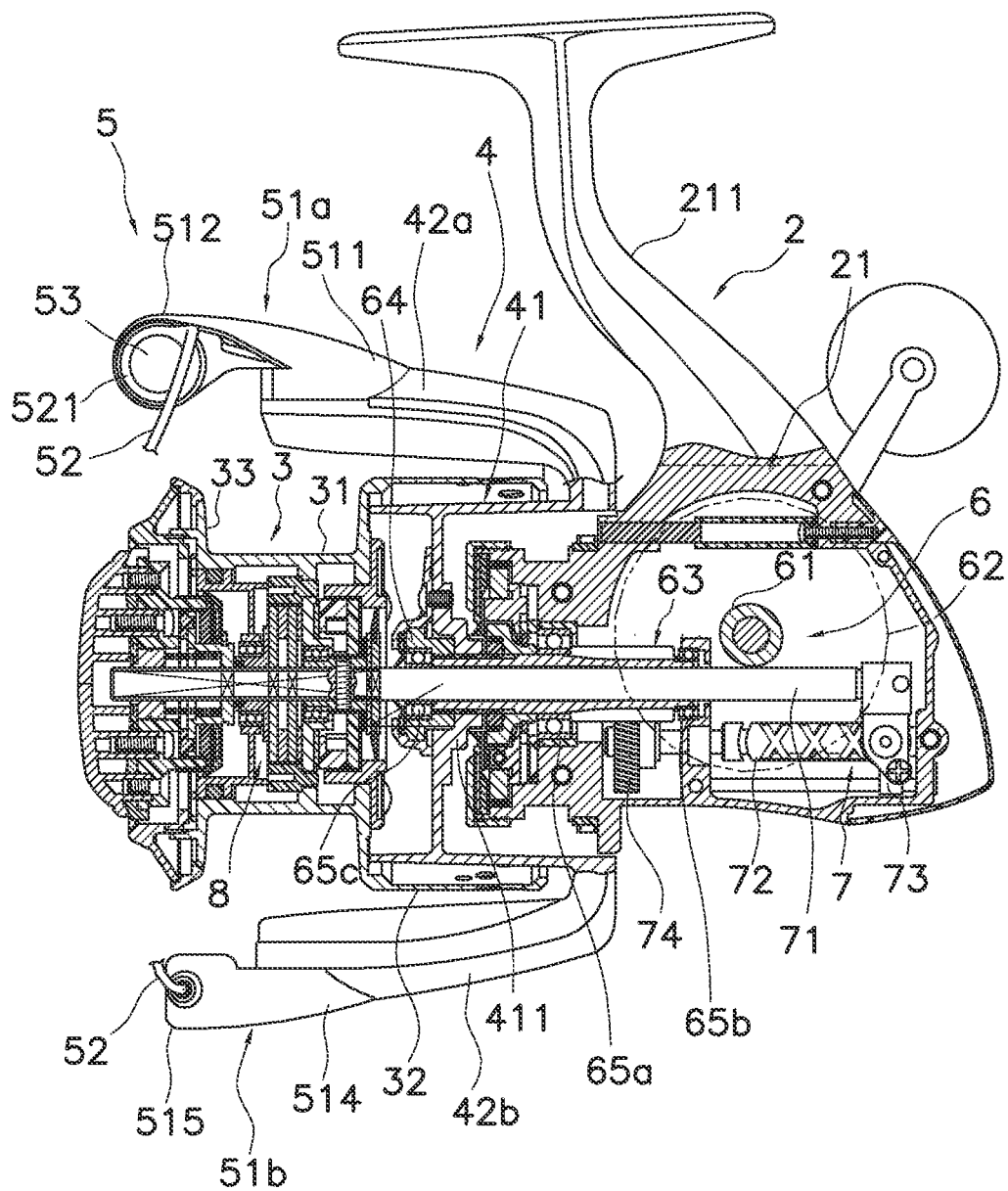
FIG. 2 is a left side cross-sectional view of the spinning reel illustrated in FIG. 1.

With reference to the attached drawings, explanation will be hereinafter made for a line roller and a fishing line guide mechanism using the same according to an exemplary embodiment of the present invention. FIG. 1 is a left side devotional view of the spinning reel, whereas FIG. 2 is a left side cross-sectional view of the spinning reel. It should be noted that in the following explanation, the left side in FIGS. 1 and 2 is defined as forward with respect to the spinning reel, while the right side in FIGS. 1 and 2 is defined as rearward with respect to the spinning reel.

Entire Structure

As illustrated in FIGS. 1 and 2, a spinning reel 10 includes a handle 1, a reel unit 2, a spool 3, a rotor 4 and a fishing line guide mechanism (so-called a bail arm) 5. The handle 1 is rotatably supported by the reel unit 2, and is attachable to either of the right and left sides of the reel unit 2.

Reel Unit 2

The reel unit 2 includes a housing 21 and a lid member 22. The housing 21 has an opening bored through a later part thereof. The lid member 22 closes the opening of the housing 21. The housing 21 contains an inner space to which various mechanisms are mounted. The housing 21 also has an attachment leg 211. The attachment leg 211 is a T-shaped portion that extends forwardly in an obliquely upward direction. As illustrated in FIG. 2, a rotor drive mechanism 6 and an oscillating mechanism 7 are disposed in the inner space of the housing 21.

The rotor drive mechanism 6 is a mechanism that is configured to rotate the rotor 4 in conjunction with rotation of the handle 1. The rotor drive mechanism 6 includes a drive shaft 61, a drive gear 62 and a pinion gear 63.

The drive shaft 61 is disposed within the housing 21, and extends in the right-and-left direction of the spinning reel 10. Both ends of the drive shaft 61 are rotatably supported by the housing 21 through bearings. The drive shaft 61 has a female threaded portion on each ends thereof. The threaded direction and the diameter of one of the female threaded portions are different from those of the other female threaded portion. The handle 1 can be screwed and attached onto either one of the female threaded portions. The drive gear 62 is fixed onto the drive shaft 61, while being unitarily rotatable therewith. The drive gear 62 is made in the form of a face gear.

The pinion gear 63 is formed in a tubular shape and is designed to be meshed with the drive gear 62. The pinion gear 63 is disposed within the housing 21, and extends in the back-and-front direction of the spinning reel 10. The front portion of the pinion gear 63 is fixed to the rotor 4 by a nut 64, while extending through the center part of the rotor 4. Further, the pinion gear 63 is rotatably supported by the reel unit 2 through a pair of bearings 65a and 65b. Specifically, the axially intermediate portion of the pinion gear 63 is supported by the bearing 65a, while the axially rear end portion of the pinion gear 63 is supported by the bearing 65b.

The oscillating mechanism 7 is a mechanism that is configured to move the spool 3 in the back-and-front direction of the spinning reel 10 in order to uniformly wind a fishing line. The oscillating mechanism 7 includes a spool shaft 71, a worm shaft 72, a slider 73 and an intermediate gear 74.

The spool shaft 71 is disposed so as to extend in the back-and-front direction. The spool shaft 71 is disposed while extending through the center part of the pinion gear 63. The spool shaft 71 is allowed to be reciprocated back and forth in the inside of the pinion gear 63. The spool shaft 71 is supported in an axially movable state. Specifically, the intermediate portion of the spool shaft 71 is supported by a bearing 65c mounted to the inside of the nut 64, while the rear portion of the spool shaft 71 is supported by the inner peripheral surface of the rear portion of the pinion gear 63. It should be noted that the spool shaft 71 is non-rotatable, while the pinion gear 63 is rotatable relatively to the spool shaft 71. Electroless nickel plating is performed on the surface of the spool shaft 71 for preventing the spool shaft 711 from getting stuck with the pinion gear 63 when the spool shaft 71 is moved back and forth while being rotated relatively to the pinion gear 63.

The worm shaft 72 is disposed below and parallel to the spool shaft 71. The slider 73 is configured to be moved back and forth along the worm shaft 72 in the back-and-front direction. The rear end of the spool shaft 71 is non-rotatably fixed to the slider 73. The intermediate gear 74 is fixed onto the tip end of the worm shaft 72, while being meshed with the pinion gear 63.

Spool 3

The spool 3 is a member that the fishing line is wound onto the outer peripheral surface thereof. The spool 3 is disposed at the front of the reel unit 2, while being movable in the back-and-front direction. When explained in more detail, as illustrated in FIGS. 1 and 2, the spool 3 is disposed between a first rotor arm 42a and a second rotor arm 42b of the rotor 4 to be described. Further, the center part of the spool 3 is coupled to the tip end of the spool shaft 71 through a drag mechanism 8. The spool 3 has a bobbin trunk 31, a skirt 32 and a flange 33. The bobbin trunk 31 is a cylindrical member that the fishing line is wound onto the outer peripheral surface thereof. The skirt 32 is formed in a cylindrical shape, and has a diameter larger than that of the bobbin trunk 31. The skirt 32 is disposed on the back of the bobbin trunk 31. The flange 33 is thrilled on the front end of the bobbin trunk 31, it should be noted that the bobbin trunk 31, the Skirt 32 and the flange 33 are integrally formed.

Rotor 4

The rotor 4 is rotatably supported at the front of the reel unit 2. As illustrated in FIG. 2, the rotor 4 has a cylindrical part 41, the first rotor arm 42a and the second rotor arm 42b. The cylindrical part 41 and the first and second rotor arms 42a and 42b are made of, for example, aluminum alloy, and are integrally formed. The cylindrical part 41, except for the rear end thereof, is accommodated in the skirt 32 of the spool 3. Further, the cylindrical part 41 has a boss portion 411 in the inside thereof. The cylindrical part 41 is fixed onto the pinion gear 63 through the boss portion 411. When explained in detail, the boss portion 411 has a through hole in the center part thereof. The pinion gear 63 extends through the through hole. The nut 64 is disposed at the front of the boss portion 411. The rotor 4 is fixed onto the pinion gear 63 by the nut 64.

The first and second rotor anus 42a and 42b extend forwardly from the lateral sides of the cylindrical part 41. The first and second rotor arms 42a and 42b are disposed in the opposite positions with respect to the circumferential direction of the cylindrical part 41.

Fishing Line Guide Mechanism 5

Figure 3:
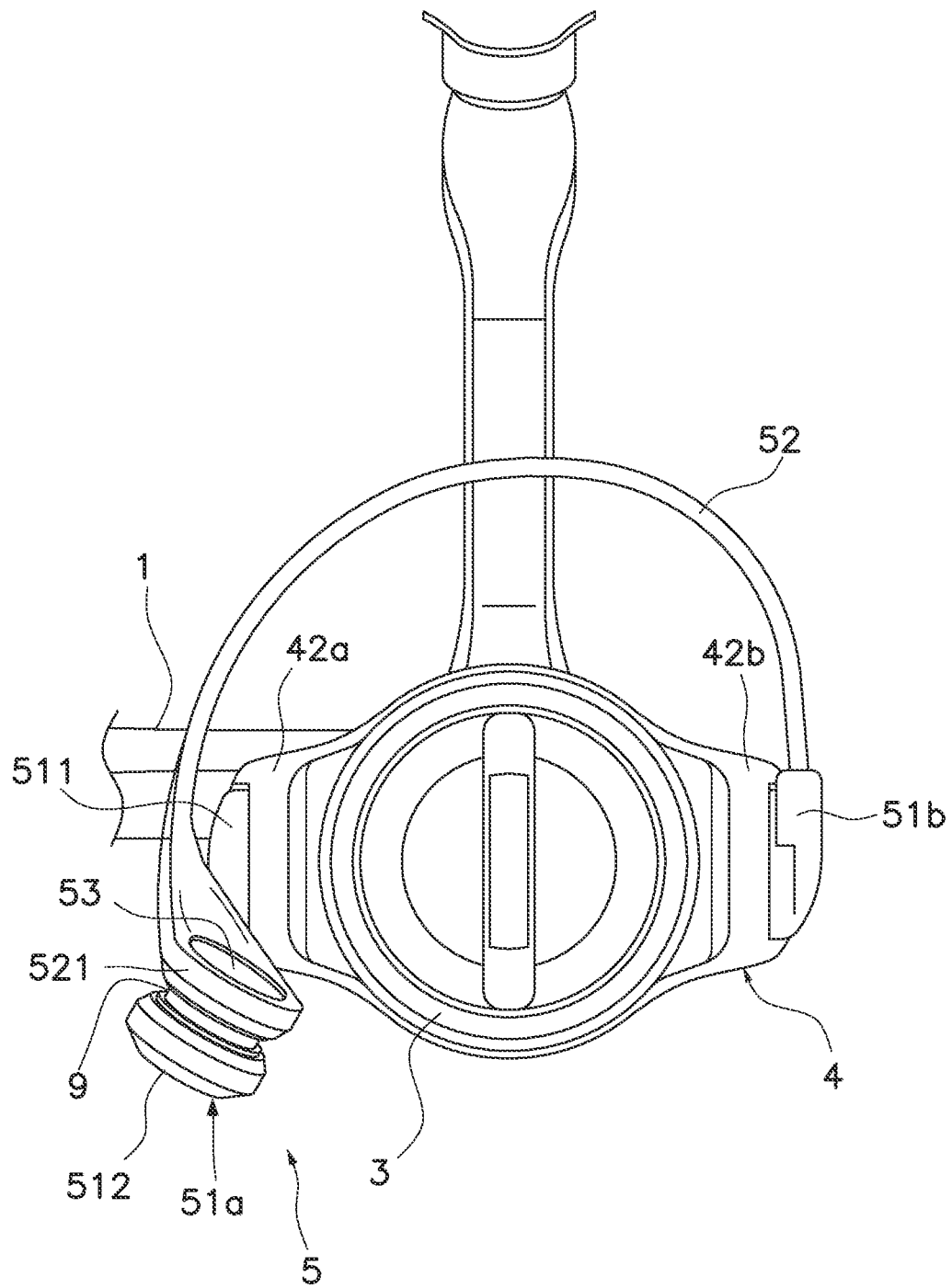
FIG. 3 is a front elevational view of the spinning reel illustrated in FIGS. 1 and 2.
Figure 4:
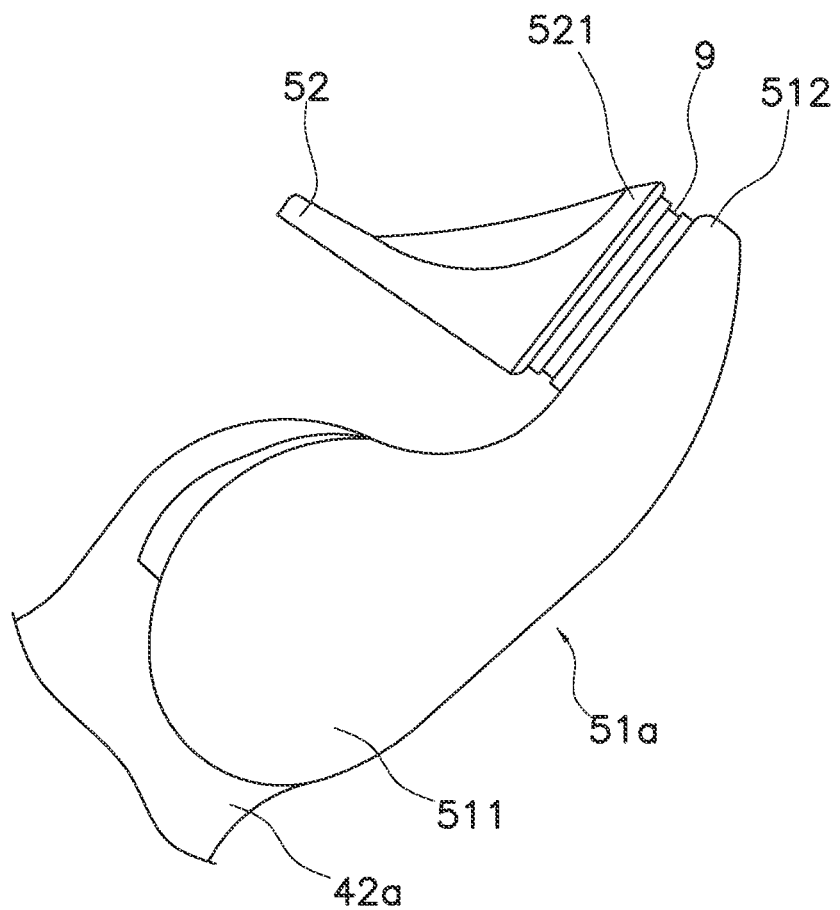
FIG. 4 is a partial enlarged view of a fishing line guide mechanism of the spinning reel illustrated in FIGS. 1-3.
Figure 5:
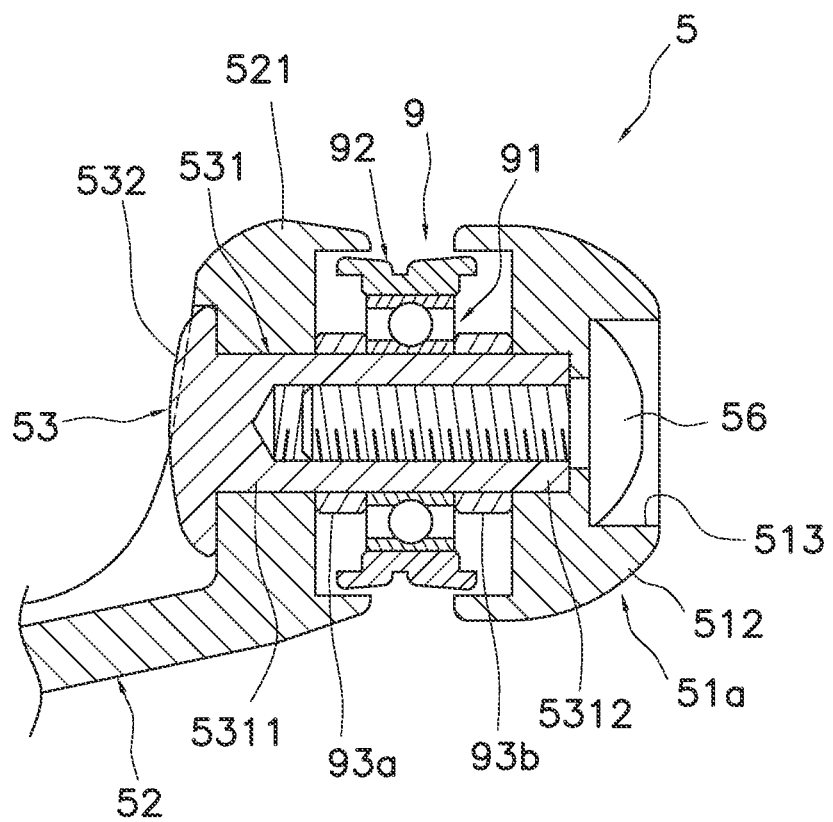
FIG. 5 is a partial enlarged cross-sectional view of the fishing line guide mechanism illustrated in FIG. 4.

FIG. 3 is a front elevational view of the spinning reel. FIG. 4 is a partial enlarged view of the fishing line guide mechanism 5, whereas FIG. 5 is a partial cross-sectional view of the fishing line guide mechanism 5. As illustrated in FIGS. 1 to 3, the fishing line guide mechanism 5 is a mechanism for guiding the fishing line onto the spool 3. The fishing line guide mechanism 5 is pivotally mounted to the tip ends of the first and second rotor arms 42a and 42h to pivot between a fishing-line guide position and a fishing-line release position. The fishing line guide mechanism 5 includes a first bail support member 51a, a second bail support member 51b, a bail 52, a stationary shaft 53, a line roller 9 and two restriction members 93a and 93b (see FIG. 5).

The first bail support member 51a is pivotally mounted to the outer side of the tip end of the first rotor arm 42a. The second bail support member 51b is pivotally mounted to the outer side of the tip end of the second rotor arm 42b. As illustrated in FIG. 4, the first bail support member 51a has a first end 511 and a second end 512. The first end 511 is pivotally mounted to the first rotor arm 42a. The second end 512 supports a cover portion 521 through the stationary shaft 53 and a fixation bolt 56. The cover portion 521 corresponds to a first end of the bail 52.

As illustrated in FIG. 5, the first hail support member 51a has a stepped through hole 513 bored in the second end 512. The fixation bolt 56 extends through the through hole 513 in order to fix the stationary shaft 53 to the first bail support member 51a. On the other hand, as illustrated in FIGS. 1 and 2, a first end 514 of the second bail support member 51b is pivotally mounted to the second rotor arm 42b, while a second end 515 of the second bail support member 51b supports a second end of the bail 52.

As illustrated in FIG. 3, the bail 52 is a roughly U-shaped member that is made of stainless alloy. The bail 52 is curved in an outwardly convex shape along the outer peripheral surface of the spool 3. The bail 52 has the cover portion 521 as the first end thereof. The cover portion 521 is supported by the first bail support member 51a through the stationary shaft 53 and the fixation bolt 56. On the other hand, the second end of the bail 52 is supported by the second bail support member 51b. The hail 52 is configured to lead the fishing line onto the line roller 9 through the cover portion 521 when the fishing line guide mechanism 5 is returned to the fishing-line guide position from the fishing-line release position.

As illustrated in FIG. 5, the stationary shaft 53 extends between the first bail support member 51a and the bail 52. When explained in more detail, the stationary shaft 53 has a shaft portion 531 and a head portion 532. The shaft portion 531 is formed in a cylindrical shape. The head portion 532 has a diameter larger than that of the shaft portion 531. A base end 5311 of the shaft portion 531 is supported by the cover portion 521 of the bail 52, while a tip end 5312 of the shaft portion 531 is supported by the second end 512 of the first bail support member 51a. The stationary shaft 53 has a female threaded portion formed on the inner peripheral surface of the shaft portion 531. The fixation bolt 56 is screwed into the female threaded portion.

Figure 6:
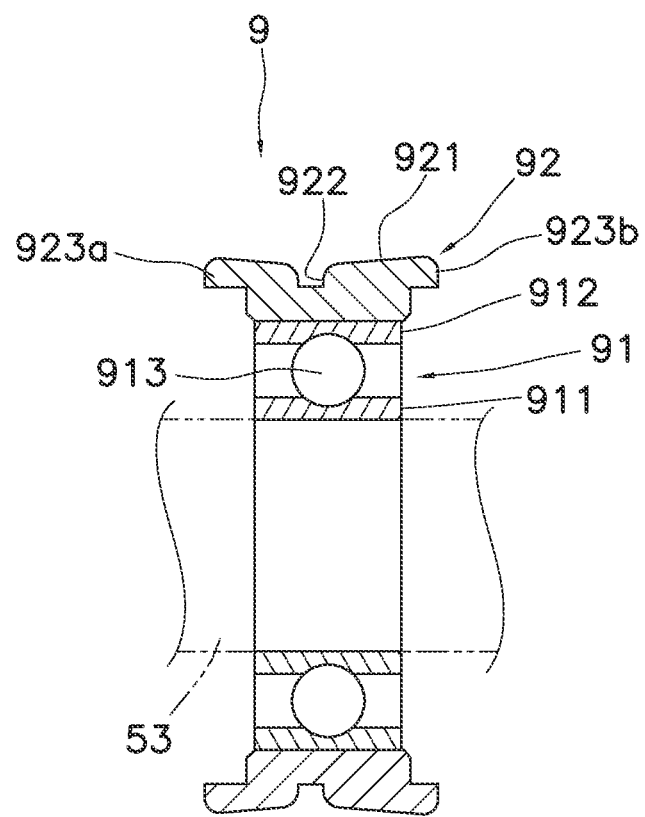
FIG. 6 is a further enlarged cross-sectional view of a line roller of the fishing line guide mechanism illustrated in FIG. 5.

FIG. 6 is a cross-sectional view of the line roller 9. As illustrated in FIG. 6, the line roller 9 includes a bearing member 91 and a guide member 92. The bearing member 91 includes a cylindrical inner race 911, a cylindrical outer race 912 and a plurality of rolling elements 913. The stationary shaft 53 is fitted into the inner race 911. In other words, the inner race 911 is firmly fixed onto the stationary shaft 53 such that relative rotation is prevented between the inner race 911 and the stationary shaft 53. The outer race 912 has a diameter larger than that of the cylindrical inner race 911. The outer race 912 is disposed on the outer peripheral side of the inner race 911. The rolling elements 913 are disposed between the inner race 911 and the outer race 912, while being circumferentially aligned at predetermined intervals. The inner race 911 and the outer race 912 are made of the same kind of metals or alloys, for example, stainless steel.

The guide member 92 is formed in a generally cylindrical shape. The bearing member 91 is integrally and firmly fixed with the guide member 92 on the inner peripheral side of the guide member 92. Specifically; the hearing member 91 is press fitted into the guide member 92. Accordingly, the guide member 92 unitarily rotates with the outer race 912. The guide member 92 is preferably made of metal or alloy having the same ionization tendency as that of the outer race 912. For example, the guide member 92 is made of stainless steel of which the outer race 912 is made.

The outer peripheral surface of the guide member 92 is formed as a guide surface 921 for guiding the fishing line. Specifically, the guide surface 921 has a circumferentially extending annular recess 922 on the center part thereof. It should be noted that the recess 922 is thrilled in a position offset from the center of the guide surface 921 towards the cover portion 521. To lead the fishing line to the recess 922, the guide surface 921 is slanted from the both ends thereof towards the recess 922.

Further, the guide member 92 has a first protruded portion 923a and a second protruded portion 923b. The first protruded portion 923a is a portion that axially protrudes more towards the cover portion 521 (i.e., leftward in FIG. 6) in comparison with the outer race 912. The first protruded portion 923a is formed in an annular shape, and is concentric to the stationary shaft 53. On the other hand, the second protruded portion 923b is a portion that axially protrudes more towards the second end 512 of the first bail support member 51a (i.e., rightward in FIG. 6) in comparison with the bearing member 91. The second protruded portion 923b is formed in an annular shape, and is concentric to the stationary shaft 53.

Moreover, as illustrated in FIG. 5, the line roller 9 can further include the first and second restriction members 93a and 9M. The first and second restriction members 93a and 93b are formed in a cylindrical shape, and are supported by the stationary shaft 53. The first and second restriction members 93 and 93b are disposed so as to interpose the bearing member 91 therebetween.

Specifically; the first restriction member 93a is disposed between the cover portion 521 and the bearing member 91. On the other hand, the second restriction member 93b is disposed between the second end 512 of the first bail support member 51a and the bearing member 91. Further, the fixation bolt 56 is screwed and tightened into the female threaded portion formed on the inner peripheral surface of the shaft portion 531 of the stationary shaft 53. Accordingly, the first and second restriction members 93a and 93b are fixed, while being interposed and held in the aforementioned positions. Thus, the first and second restriction members 93a and 93b restrict the line roller 9 from axially moving to a large amount. It should be noted that the inner diameters of the first and second restriction members 93a and 93b are larger than or equal to the outer diameter of the stationary shaft 53. Further, the outer diameters of the first and second restriction members 93a and 93b are larger than the outer diameter of the inner race of the bearing member 91.

Actions

Next, operations and actions of the reel will be hereinafter explained in detail. In casting, the rotor 4 is set in the reverse rotation prevented state, and the fishing line guide mechanism 5 is flipped over to the fishing-line release position while being held by the angler's hand. The fishing line can be easily reeled out of the spool 3 under the condition that the fishing line guide mechanism 5 is pivoted down to the fishing-line release position.

After casting, when the handle 1 is rotated in the fishing-line winding direction under the condition that the fishing line guide mechanism 5 is kept set in the fishing-line release position, the rotor drive mechanism 6 causes the rotor 4 to rotate in the fishing-line winding direction. When the rotor 4 is rotated in the fishing-line winding direction, the fishing line guide mechanism 5 is returned to the fishing-line guide position. When the handle 1 is herein further rotated in the fishing-line winding direction, the fishing line is led to the line roller 9 from the bail 52 through the cover portion 521, and is wound about the spool 3.

Features

The line roller 9 according to the present exemplary embodiment has the following features.

The line roller 9 according to the present exemplary embodiment is a member for guiding the fishing line onto the spool 3 of the spinning reel 10. The line roller 9 includes the bearing member 91 and the guide member 92. The bearing member 91 includes the cylindrical inner race 911, the cylindrical outer race 912 disposed on the outer peripheral side of the inner race 911, and the rolling elements 913 that are disposed between the inner race 911 and the outer race 912 while being circumferentially aligned at intervals. The guide member 92 is made of material of the same kind as that of the outer race 912. Further, the guide member 92 is a tubular member having the guide surface 921 on the outer peripheral surface thereof in order to guide the fishing line. The guide member 92 is firmly fixed to the bearing member 91 on the outer peripheral surface of the bearing member 91.

According to the structure, the bearing member 91 and the guide member 92 are produced as separate members. Therefore, even when the guide surface 921 as the outer peripheral surface of the guide member 92 is processed, this does not negatively affect smoothness in rotation of the bearing member 91. Further, the guide member 92 is directly and firmly fixed to the bearing member 91. Therefore, the line roller 9 is smoothly rotated. It should be noted that occurrence of galvanic corrosion can be suppressed between the guide member 92 and the bearing member 91, although the guide member 92 is directly and firmly fixed to the bearing member 91. This is due to the fact that the guide member 92 and the bearing member 91 are made of the same kind of materials.

The inner race 911, the outer race 912 and the guide member 92 are made of the same kind of materials. According to the structure, occurrence of galvanic corrosion can be further suppressed among these elements.

The guide member 92 has the annular recess 922 extending circumferentially on the guide surface 921. According to the structure, the fishing line can be guided to the spool 3 with use of the recess 922 formed on the guide surface 921.

The guide member 92 and the outer race 912 are made of metals or alloys having the same ionization tendency. According to the structure, occurrence of galvanic corrosion can be suppressed between these elements.

The guide member 92 is integrally and firmly fixed to the outer race 912 when the outer race 912 is press fitted into the guide member 92. According to the structure, the guide member 92 can be easily and firmly fixed onto the outer race 912.

Modifications

An exemplary embodiment of the present invention has been described above. However, the present invention is not limited to the exemplary embodiment, and a variety of changes can be herein made without departing from the scope of the present invention.

(First Modification)

Figure 7:
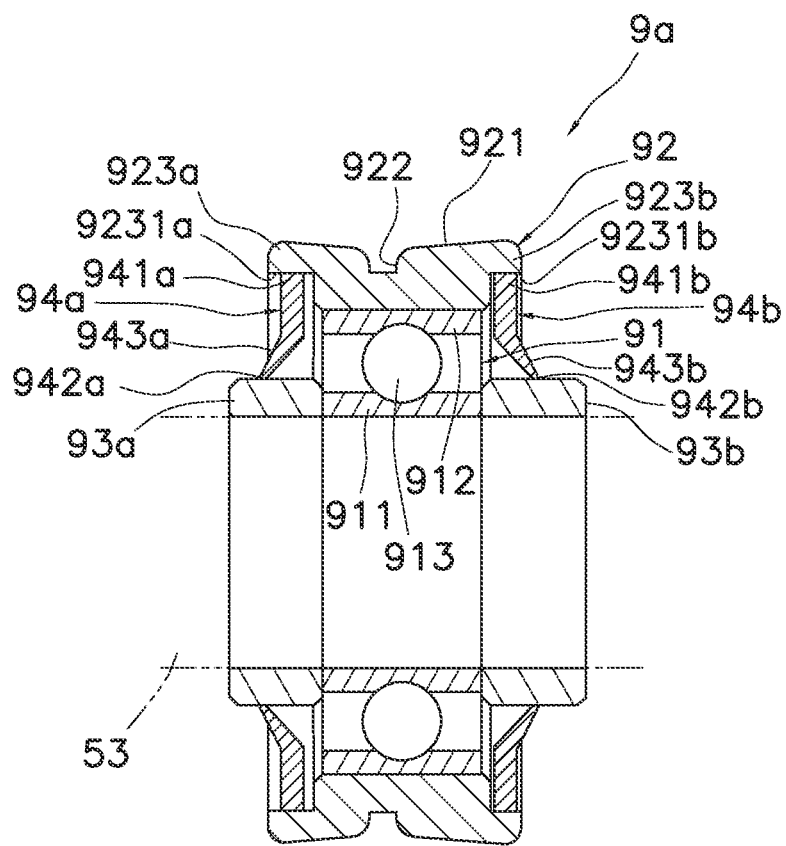
FIG. 7 is a cross-sectional view of a line roller according to a first modification.

The line roller 9 according to the aforementioned exemplary embodiment can be alternatively structured as illustrated in FIG. 7. Specifically, unlike the line roller 9 according to the aforementioned exemplary embodiment, a line roller 9a according to a first modification thriller includes a first seal member 94a and a second seal member 94b.

The first and second seal members 94a and 94b are annular members made of material with elasticity, and serve to prevent water and so forth from entering the bearing member 91. For example, the first and second seal members 94a and 94b may be preferably made of synthetic rubber, natural rubber, or so forth, and may be specifically made of NBR (Nitril-Butadiene Rubber, which is a copolymer of butadiene and acrylonitrile) or so forth. The first seal member 94a is disposed on the left side of the bearing member 91. While the second seal member 94b is disposed on the right side of the bearing member 91.

An outer peripheral side end 941.a of the first seal member 94a is attached to an inner peripheral surface 9231.a of the first protruded portion 923a. The first seal member 94a has a first lip part 943a at the inner peripheral side thereof. The first lip part 943a is formed to become thinner toward the inner periphery. The first lip part 943a slants away from the bearing member 91 toward the inner periphery. An inner peripheral end 942a of the first lip part 943a contacts the outer peripheral surface of the first restriction member 93a. For example, an annular groove is formed on the inner peripheral surface 9231a of the first protruded portion 923a so as to extend circumferentially thereon. Further, the outer peripheral end 941a of the first seal member 94a is fitted into the annular groove. Accordingly, the first seal member 94a is configured to be attached to the first protruded portion 923a. Further, the inner peripheral end 942a of the first seal member 94a presses the outer peripheral surface of the first restriction member 93a to the extent that water can be prevented from entering from the side with the bearing member 91.

An outer peripheral end 941b of the second seal member 94b is attached to an inner peripheral surface 9231b of the second protruded portion 923b. The second seal member 94b has a second lip part 943b at the inner peripheral side thereof. The second lip part 943b is formed to become thinner toward the inner periphery. The second lip part 943b slants away from the bearing member 91 toward the inner periphery. An inner peripheral end 942b of the second lip part 943b contacts the outer peripheral surface of the second restriction member 93b. For example, an annular groove is formed on the inner peripheral surface 9231B of the second protruded portion 923b so as to extend circumferentially thereon. Further, the outer peripheral end 941b of the second seal member 94b is fitted into the annular groove. Accordingly, the second seal member 94b is allowed to be attached to the second protruded portion 923b. Further, the inner peripheral end 942b of the second seal member 94b presses the outer peripheral surface of the second restriction member 93b to the extent that water can be prevented from entering from the side with the bearing member 91.

Further, in the line roller 9a according to the first modification, the outer peripheral surfaces of the first and second restriction members 93a and 93b preferably have water repellency. For example, in each of the first and second restriction members 93a and 93b, a contact angle of 90 degrees or greater is formed by the outer peripheral surface thereof and a water droplet attached to the outer peripheral surface. Further, the following may be performed for applying water repellency to the outer peripheral surfaces of the first and second restriction members 93a and 93b. For example, material with water repellency may be applied to the outer peripheral surfaces of the first and second restriction members 93a and 93b. Alternatively, the first and second restriction members 93a and 93b may be made of material with water repellency, it should be noted that the material with water repellency is, for example, material containing fluorine resin, silicone resin or so forth.

The line roller 9a according to the first modification as explained above has the following features.

The line roller 9a according to the first modification is a component for guiding the fishing line onto the spool 3 of the spinning reel 10. The line roller 9a includes the bearing member 91, the guide member 92 and the first and second seal members 94a and 94b. The bearing member 91 includes the cylindrical inner race 911, the cylindrical outer race 912 disposed on the outer peripheral side of the inner race 911, and the rolling elements 913 that are disposed between the inner race 911 and the outer race 912 while being circumferentially aligned at intervals. The guide member 92 is formed in a tubular shape, and has the guide surface 921 on the outer peripheral surface in order to guide the fishing line. The guide member 92 is integrally and firmly fixed to the bearing member 91 on the outer peripheral surface of the bearing member 91. Further, the guide member 92 has a first protruded portion 923a and a second protruded portion 923b. The first and second protruded portions 923a and 923b are axially protruded in comparison with the outer race 912. The first seal member 94a is an annular member that extends radially inwards from the inner peripheral surface 9231a of the first protruded portion 923a. On the other hand, the second seal member 94b is an annular member that extends radially inwards from the inner peripheral surface 9231b of the second protruded portion 923b.

According to the structure, the following advantageous effects can be achieved in addition to those explained in the aforementioned exemplary embodiment. Specifically, the annular first seal member 94a is mounted so as to extend radially inwards from the inner peripheral surface 9231a of the first protruded portion 923a of the guide member 92. Therefore, the axially lateral surface of the bearing member 91 can be covered with the first seal member 94a on the side with the cover portion 521. Likewise, the annular second seal member 94b is mounted so as to extend radially inwards form the inner peripheral surface 9231b of the second protruded portion 923b of the guide member 92. Therefore, the axially lateral surface of the bearing member 91 can be covered with the second seal member 94b on the side with the first bail support member 51a. As a result, it is possible to prevent troubles such as water intrusion into the bearing member 91 by the first and second seal members 94a and 94b.

Moreover, the line roller 9a according to the first modification further includes the first and second restriction members 93a and 93b that are cylindrically formed and disposed adjacently to the bearing member 91 in the axial direction. The inner peripheral end 942a of the first seal member 94a contacts the outer peripheral surface of the first restriction member 93a. Likewise, the inner peripheral end 942b of the second seal member 94b contacts the outer peripheral surface of the second restriction member 93b.

According to the structure, the lateral surface of the bearing member 91 on the cover portion 521 side can be covered with the first seal member 94a that extends between the first protruded portion 923a and the first restriction member 93a. Likewise, the lateral surface of the bearing member 91 on the first bail support member 51a side can be covered with the second seal member 94b that extends between the second protruded portion 923b and the second restriction member 93b. As a result, it is possible to prevent troubles such as water intrusion into the bearing member 91.

Further, the outer peripheral surfaces of the first and second restriction members 93a and 93b according to the first modification have water repellency. According to the structure, water is repelled by the outer peripheral surfaces of the first and second restriction members 93a and 93b. Therefore, it is possible to more reliably prevent water intrusion into the bearing member 91.

(Second Modification)

Figure 8:
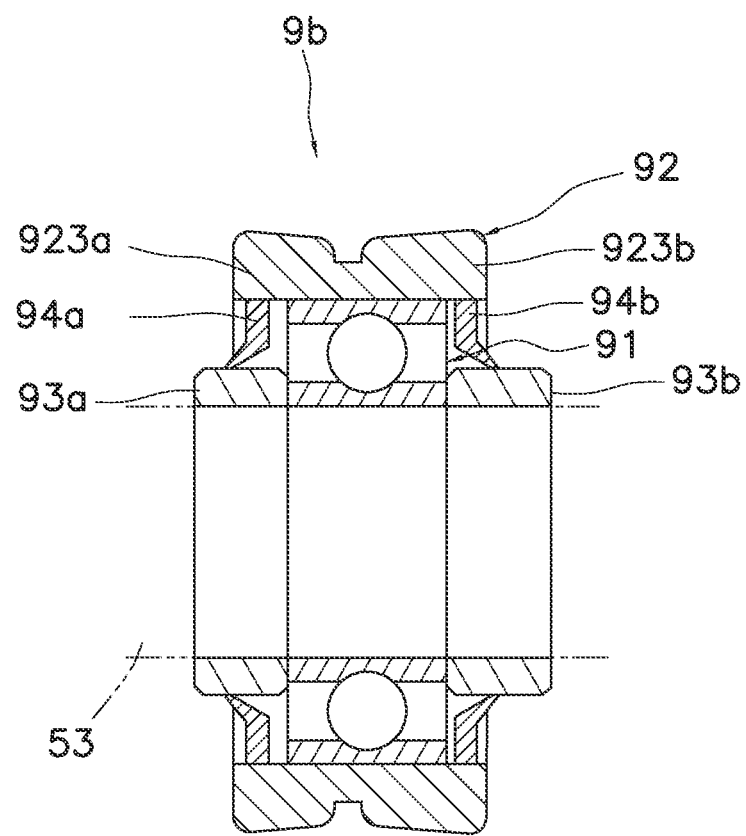
FIG. 8 is a cross-sectional view of a line roller according to a second modification.

FIG. 8 is a cross-sectional view of a line roller 9b according to a second modification. In the line roller 9a according to the aforementioned first modification, the first and second protruded portions 923a and 923b of the guide member 92 are formed on the radially outer peripheral side. However, the positions where the first and second protruded portions 923a and 923b are formed are not particularly limited to the above. For example, as illustrated in FIG. 8, the first and second protruded portions 923a and 923b can be entirely formed in the radial direction. Alternatively; the first and second protruded portions 923a and 923b may be formed on the radially inner side.

(Third Modification)

Figure 9:
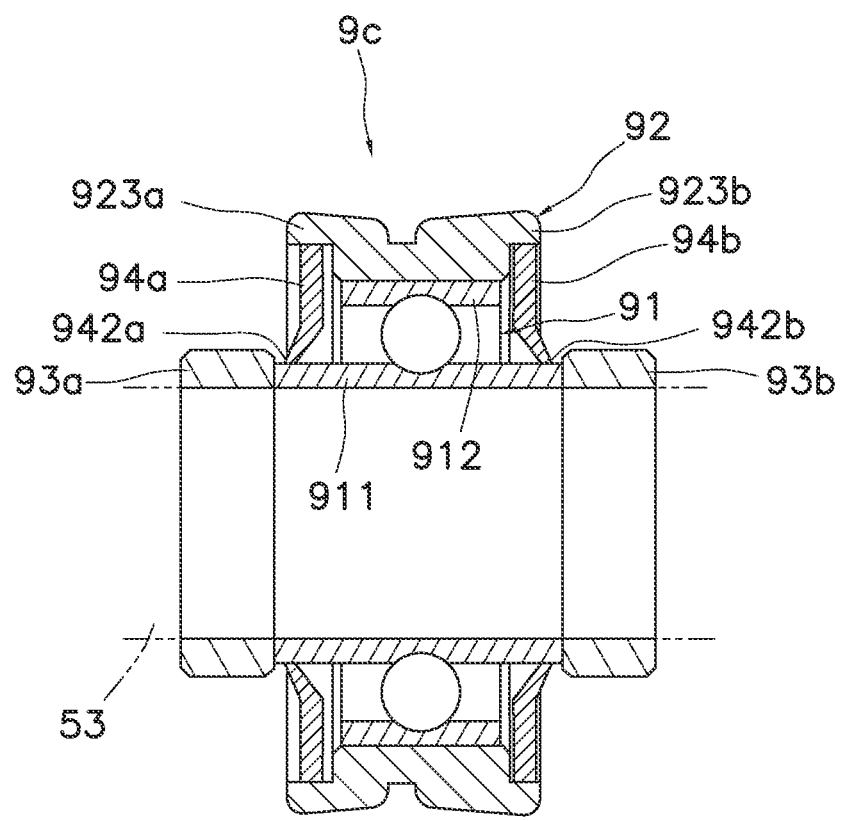
FIG. 9 is a cross-sectional view of a line roller according to a third modification.

FIG. 9 is a cross-sectional view of a line roller 9c according to a third modification. In the line roller 9a according to the first modification and the line roller 9b according to the second modification, the inner peripheral end 942a of the first seal member 94a contacts the first restriction member 93a, and the inner peripheral end 942b of the second seal member 94b contacts the second restriction member 93b. However, the structure of the line roller of the present invention is not limited to the above. For example, as illustrated in FIG. 9, the bearing member 91 can be designed to have a structure that the axial length of the inner race 911 is longer than that of the outer race 912. Further, the inner peripheral end 942a of the first seal member 94a and the inner peripheral end 942b of the second seal member 94b can be designed to contact the outer peripheral surface of the inner race 911.

(Fourth Modification)

Figure 10:
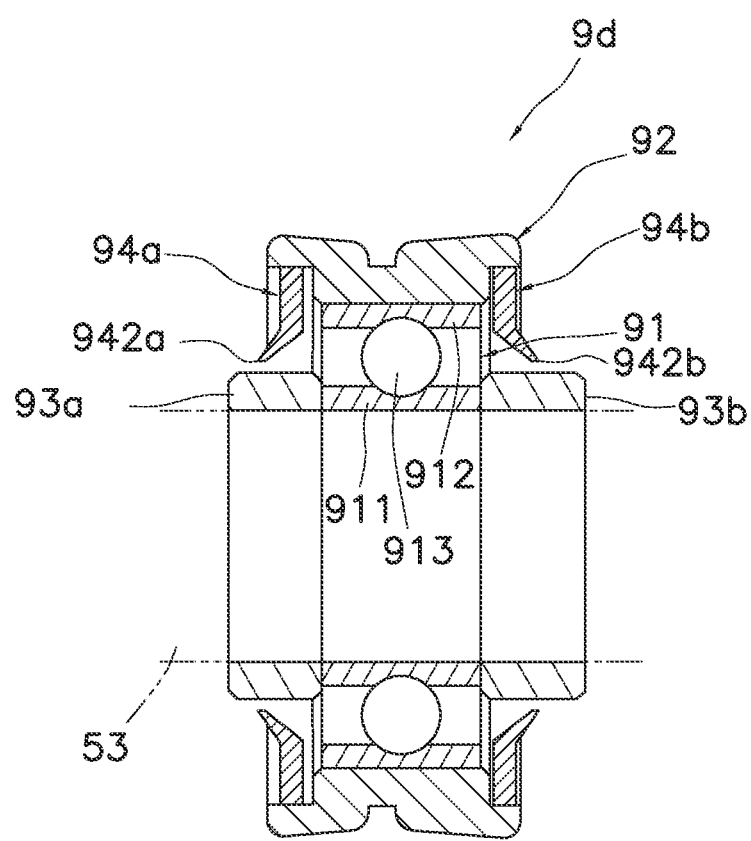
FIG. 10 is a cross-sectional view of a line roller according to a fourth modification.

FIG. 10 is a cross-section view of a line roller 9d according a fourth modification. In the line roller 9a according to the first modification, the line roller 9b according to the second modification, and the line roller 9c according to the third modification, the inner peripheral end 942.a of the first seal member 94a contacts the first restriction member 93a and the inner peripheral end 942b of the second seal member 94b contacts the second restriction member 93b. However, the structure of the line roller of the present invention is not limited to the above.

For example, as illustrated in FIG. 10, the first seal member 94a can be configured not to contact the first restriction member 93a. In particular, the inner peripheral end 942a of the first seal member 94a faces the outer peripheral surface of the first restriction member 93a with an interval. The distance between the inner peripheral end 942a of the first seal member 94a and the outer peripheral surface of the first restriction member 93a is preferably around 0.05 mm to 0.3 mm, more preferably around 0.1 mm to 0.2 mm. At least one of the inner peripheral end 942a of the first seal member 94a and the outer peripheral surface of the first restriction member 93a has water repellency.

The second seal member 94b can be configured not to contact the second restriction member 93b. In particular, the inner peripheral end 942b of the second seal member 94b faces the outer peripheral surface of the second restriction member 93b with an interval. The distance between the inner peripheral end 942b of the second seal member 94b and the outer peripheral surface of the second restriction member 93b is preferably around 0.05 mm to 0.3 mm, more preferably around 0.1 mm to 0.2 mm.

At least one of the inner peripheral end 942b of the second seal member 94b and the outer peripheral surface of the second restriction member 93b has water repellency. In the present modification, the outer peripheral surface of the first restriction member 93a and the outer peripheral surface of the second restriction member 93b have water repellency in terms of in terms of aging, an effect of an external environment, and easy water repellent processing.

(Fifth Modification)

To reliably and firmly fix the guide member 92 to the bearing member 91, the inner peripheral surface of the guide member 92 and the outer peripheral surface of the outer race 912 can be adhered to each other by an adhesive or so forth. In this case, the bearing member 91 may or may not be fitted into the guide member 92.

(Sixth Modification)

A surface treated layer may be formed at least on the guide surface 921 of the guide member 92 by surface treating. For example, a surface treated layer made of DLC (Diamond-Like Carbon) or so forth can be formed at least on the guide surface 921 of the guide member 92 by means of a CVD method, a PVD method or so forth. Alternatively, IP (Ion Plating) may be performed at least for the guide surface 921 of the guide member 92. It should be noted that any suitable surface treating is preferably performed for the guide member 92 before the guide member 92 is firmly fixed onto the beating member 91. Accordingly, surface treating can be (performed only for the guide member 92 without being performed for the bearing member 91. As a result, deterioration in rotational smoothness of the bearing member 91 can be prevented.

(Seventh Modification)

In the aforementioned exemplary embodiment, the outer race 912 of the bearing member 91 and the guide member 92 are made of metals or alloys having the same ionization tendency. However, the ionization tendencies of the metals or alloys may not be completely the same as long as they are the same to the extent that occurrence of galvanic corrosion can be prevented.

What is claimed is:

1. A line roller for guiding a fishing line onto a spool of a spinning reel, comprising;
   a bearing member including:
   an inner race having a cylindrical shape;
   an outer race having a cylindrical shape and being disposed on an outer peripheral side of the inner race; and
   a plurality of rolling elements being circumferentially aligned at intervals between the inner race and the outer race;
   a guide member having a tubular shape, the guide member being made of a material of the same kind as a material of the outer race, the guide member having a guide surface arranged to guide the fishing line on an outer peripheral surface of the guide member, the guide member being fixed to the bearing member on an outer peripheral surface of the bearing member; and
   a rubber seal member attached to the guide member.

2. The line roller according to claim 1, wherein
the seal member has an annular shape,
the guide member has a protruded portion that protrudes axially more than the outer race in an axial direction of the bearing member, and
the seal member extends radially inwards from an inner peripheral surface of the protruded portion.

3. The line roller according to claim 2, further comprising:
a restriction member having a cylindrical shape and being disposed axially adjacent to the bearing member, and
the seat member extending toward an outer peripheral surface of the restriction member.

4. The line roller according to claim 2, wherein
the inner race has an axial length that is larger than an axial length of the outer race, and
the seal member has an inner peripheral end that contacts an outer peripheral surface of the inner race.

5. The line roller according to claim 3, wherein
an inner peripheral end of the seal member faces the outer peripheral surface of the restriction member with a gap between the inner peripheral end of the seal member and the outer peripheral surface of the restriction member, and
at least one of the inner peripheral end of the seal member and the outer peripheral surface of the restriction member has water repellency.

6. The line roller according to claim 5, wherein
the outer peripheral surface of the restriction member has water repellency.

7. The line roller according to claim 3, wherein
the inner peripheral end of the seal member contacts the outer peripheral surface of the restriction member, and
at least one of the inner peripheral end of the seal member and the outer peripheral surface of the restriction member has water repellency.

8. The line roller according to claim 7, wherein
the outer peripheral surface of the restriction member has water repellency.

9. The line roller according to claim 1, wherein
the inner race, the outer race and the guide member are made of the same kind of materials.

10. The line roller according to claim 1, wherein
the guide surface of the guide member has a circumferentially extending annular recess.

11. The line roller according to claim 1, wherein
the guide member and the outer race are made of metals or alloys having the same ionization tendency.

12. The line roller according to claim 1, wherein
the outer race and the guide member are made of stainless steel.

13. The line roller according to claim 1, wherein
the guide member is press fitted onto the outer race.

14. The line roller according to claim 1, wherein
the guide member has an inner peripheral surface adhered onto an outer peripheral surface of the outer race.

15. The line roller according to claim 1, wherein
the guide member has a surface treated layer at least on the guide surface, the surface treated layer being formed by surface treating.

16. A fishing line guide mechanism including the line roller according to claim 1 for guiding a fishing line onto a spool of a spinning reel, the fishing line guide mechanism being configured to be mounted to tip ends of a pair of rotor arms of a rotor of the spinning reel, the fishing line guide mechanism comprising:
a bail;
a first bail support member supporting a first end of the bail, the first bail support member being configured to be mounted to the tip end of one of the rotor arms;
a second bail support member supporting a second end of the bail, the second bail support member configured to be being mounted to the tip end of the other of the rotor arms; and
a stationary shaft extending between the first bail support member and the first end of the bail, the line roller being rotatably supported by the stationary shaft.

* * * * *